UNITED STATES PATENT OFFICE.

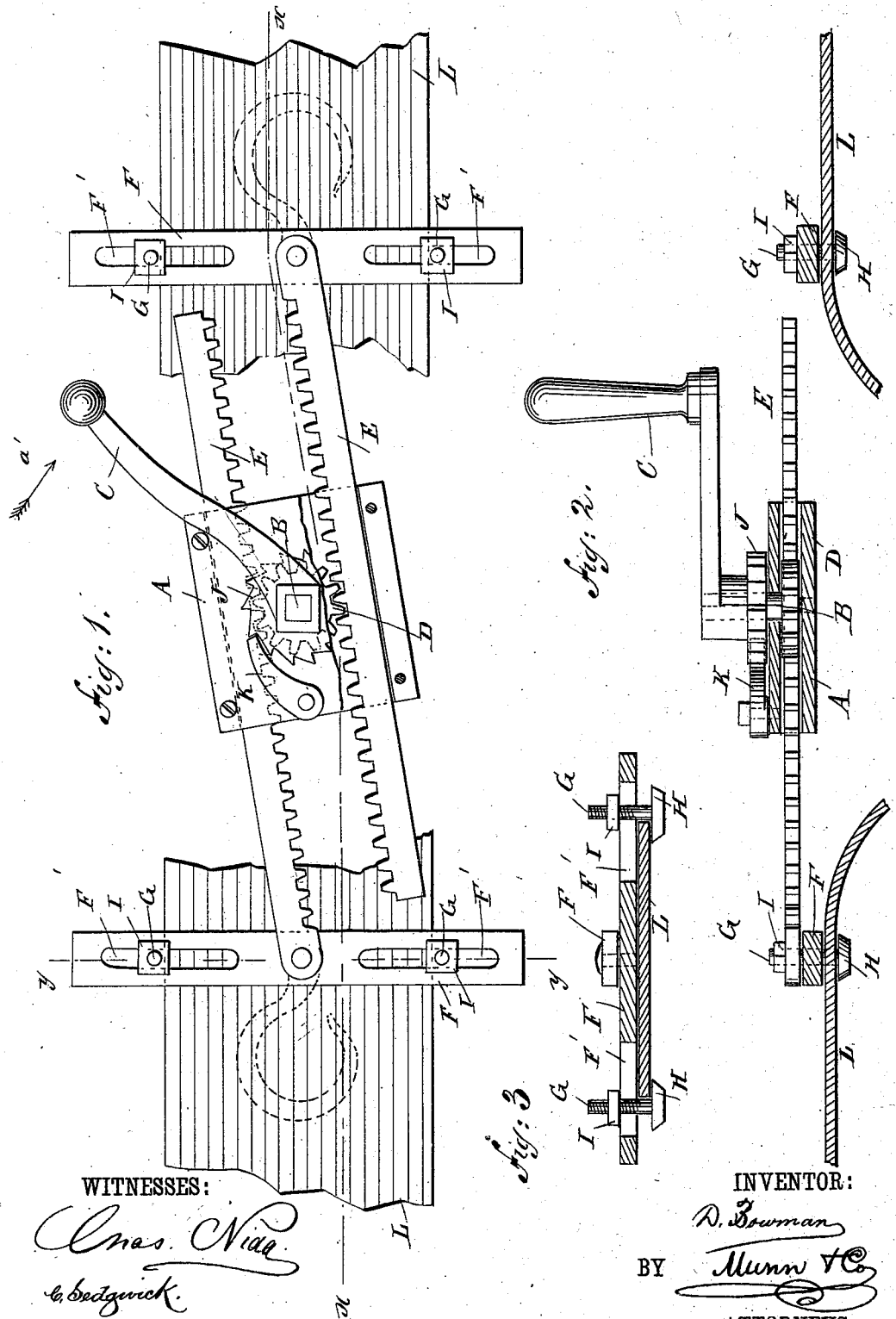

DOCK BOWMAN, OF CYNTHIANA, KENTUCKY.

BELT-TIGHTENER.

SPECIFICATION forming part of Letters Patent No. 380,081, dated March 27, 1888.

Application filed July 14, 1887. Serial No. 244,307. (No model.)

*To all whom it may concern:*

Be it known that I, DOCK BOWMAN, of Cynthiana, in the county of Harrison and State of Kentucky, have invented a new and Improved Belt-Tightener, of which the following is a full, clear, and exact description.

The object of my invention is to provide a new and improved belt-tightener especially adapted for stretching a belt while it is held on its pulleys, so as to enable the operator to cut part of the belt out and relace the ends, thereby shortening and tightening the belt to any length and any desired degree of tension.

The invention consists in the construction and arrangement of certain parts and details and combinations of the same, as will be fully described hereinafter, and pointed out in the claims.

Reference is to be had to the accompanying drawings, forming a part of this specification, in which similar letters of reference indicate corresponding parts in all the figures.

Figure 1 is a plan view of my improvement with parts of the casing broken out. Fig. 2 is a longitudinal sectional elevation of the same on the line $x\ x$ of Fig. 1, and Fig. 3 is a vertical cross-section of the same on the line $y\ y$ of Fig. 1.

My improved belt-tightener is provided with a casing, A, which is open at its ends and carries in its center a shaft, B, on one end of which is secured a crank-arm, C, for turning said shaft in its bearings in the casing A. On the shaft B is secured, inside of the casing A, the gear-wheel D, into opposite sides of which mesh the racks E, extending in opposite directions, and each being pivoted at one end to a cross-rod, F, provided with the slots F', in which are held adjustably the clamping-bolts G, each provided on its lower end with a clamping-head, H, and on its threaded upper end screws a nut, I, for securing said clamping-bolt G to the cross-bar F.

On the shaft B, outside of the casing A, is secured a ratchet-wheel, J, which engages a pawl, K, pivoted on the casing A, and adapted to hold and lock said shaft B in position when the belt is stretched.

The operation is as follows: The cross-bars F are placed across the top of the belt L suitable distances apart, and then each cross-bar F is clamped to the belt by engaging the head H of the clamping-bolt G with the under side of the belt, and then tightening the nut I until the cross-bar F is securely fastened to the belt L. The operator now turns the crank-arm C in the direction of the arrow $a'$, thereby causing the racks E to move toward each other in opposite directions, whereby the cross-bars F are pulled toward each other, thus stretching the belt L, to which said cross-bars F are secured. As soon as the belt L has been sufficiently stretched, the operator cuts out part of the loose piece of the belt between the cross-bars F, and then relaces the ends of the belt in the usual manner. It will be seen that the operator can thus stretch the belt L to any desired degree, so as to give the belt any desired tension. As soon as the belt is relaced, the pawl K is disengaged from its ratchet-wheel J and the clamping-bolts G are removed from the belt L, so that the entire device can be taken off of the belt.

If it is desirable to use the tightener on chain belts, I provide each cross-bar F with a hook, (shown in dotted lines in Fig. 1,) and fasten said hook into the links of the chain, which can then be tightened in the same manner as above described in relation to the belt L.

Having thus fully described my invention, I claim as new and desire to secure by Letters Patent—

1. In a belt-tightener, the combination, with a casing open at both ends, of a shaft mounted to rotate in said casing, a gear-wheel secured to said shaft inside of said casing, racks meshing into said gear-wheel at opposite sides, cross-bars pivotally connected with said racks and adapted to be secured to the belt to be tightened, a ratchet-wheel secured to said shaft, and a pawl pivoted on said casing and engaging said ratchet-wheel, so as to hold the latter in position when the belt is tightened, substantially as shown and described.

2. In a belt-tightener, the combination, with a casing open at both ends, of a shaft mounted to turn in said casing, a clamp-arm for turning said shaft, a gear-wheel secured to said shaft inside of said casing, racks meshing into said wheel at opposite sides, cross-bars pivotally connected with said racks, each cross-bar being provided with a slot, clamping-bolts held adjustably in the slots of said cross-bars for securing the latter to the belt to be tightened, a ratchet-wheel secured to said shaft, and a pawl pivoted to said casing and engaging said ratchet-wheel, substantially as shown and described.

DOCK BOWMAN.

Witnesses:
T. T. FORMAN,
W. S. CASON.